(12) United States Patent
Bomphray

(10) Patent No.: US 10,946,614 B2
(45) Date of Patent: Mar. 16, 2021

(54) STRUCTURAL MEMBER

(71) Applicant: WILLIAMS ADVANCED ENGINEERING LIMITED, Wantage (GB)

(72) Inventor: Iain Bomphray, Wantage (GB)

(73) Assignee: WILLIAMS ADVANCED ENGINEERING LIMITED, Oxfordshire (GB)

( * ) Notice: Subject to any disclaimer, the term of this patent is extended or adjusted under 35 U.S.C. 154(b) by 0 days.

(21) Appl. No.: 16/315,508

(22) PCT Filed: Jul. 5, 2017

(86) PCT No.: PCT/GB2017/051986
§ 371 (c)(1),
(2) Date: Jan. 4, 2019

(87) PCT Pub. No.: WO2018/007815
PCT Pub. Date: Jan. 11, 2018

(65) Prior Publication Data
US 2019/0315088 A1   Oct. 17, 2019

(30) Foreign Application Priority Data
Jul. 7, 2016   (GB) .................................. 1611862

(51) Int. Cl.
*B32B 5/02*   (2006.01)
*B29C 70/30*   (2006.01)
(Continued)

(52) U.S. Cl.
CPC ............ *B32B 5/024* (2013.01); *B29C 70/30* (2013.01); *B32B 3/266* (2013.01); *B32B 5/26* (2013.01);
(Continued)

(58) Field of Classification Search
CPC ...................................................... B32B 5/024
(Continued)

(56) References Cited

U.S. PATENT DOCUMENTS

2002/0150747 A1   10/2002   Wellman et al.
2005/0012298 A1*  1/2005   Dal Pra .................. B29C 70/081
                                                    280/281.1

FOREIGN PATENT DOCUMENTS

DE         19527197 A1      1/1997
DE    102013007284 A1     10/2014
(Continued)

OTHER PUBLICATIONS

International Search Report corresponding PCT/GB2017/051986, dated Oct. 5, 2017.
(Continued)

*Primary Examiner* — Brent T O'Hern
(74) *Attorney, Agent, or Firm* — Lando & Anastasi, LLP

(57) ABSTRACT

The invention relates to a structural member comprising: a core portion that defines at least one anchor point, the core having at least one surface, a fibre tow arranged in a closed loop on the surface of the core portion, the loop defining a boundary of a space which contains the at least one anchor point, and a protective shell formed from a woven fibre sheet material which covers the fibre tow, and in which the core, fibre tow and the protective shell are impregnated and bound together by a cured resin. The invention also relates to a method of constructing a structural member.

17 Claims, 3 Drawing Sheets

(51) Int. Cl.
  *B32B 3/26*   (2006.01)
  *B32B 5/26*   (2006.01)
  *B29K 277/00* (2006.01)
  *B29K 307/04* (2006.01)
  *B29K 309/08* (2006.01)
  *B29L 31/30*  (2006.01)
  *B60G 7/00*   (2006.01)

(52) U.S. Cl.
  CPC ...... *B29K 2277/10* (2013.01); *B29K 2307/04* (2013.01); *B29K 2309/08* (2013.01); *B29L 2031/3076* (2013.01); *B32B 2262/0269* (2013.01); *B32B 2262/101* (2013.01); *B32B 2262/106* (2013.01); *B32B 2605/18* (2013.01); *B60G 7/001* (2013.01)

(58) Field of Classification Search
  USPC .......................................................... 428/137
  See application file for complete search history.

(56) References Cited

FOREIGN PATENT DOCUMENTS

| | | |
|---|---|---|
| EP | 0572752 A1 | 12/1993 |
| EP | 0594131 A1 | 4/1994 |
| EP | 0818289 A2 | 1/1998 |
| EP | 1308265 A1 | 5/2003 |
| JP | H10109511 A | 4/1998 |
| JP | 2011126075 A | 6/2011 |
| KR | 101549918 B1 | 9/2015 |
| WO | 2018007815 A1 | 1/2018 |

OTHER PUBLICATIONS

GB Search Report, corresponding to GB1611862.2, dated Dec. 19, 2016.

\* cited by examiner

STRUCTURAL MEMBER

CROSS-REFERENCE TO RELATED APPLICATIONS

This application is a U.S. National Phase Application and claims the benefit under 35 U.S.C. § 371 of International Application No. PCT/GB2017/051986, filed Jul. 5, 2017, titled "A STRUCTURAL MEMBER," which claims priority to British Application No. 1611862.2, filed on Jul. 7, 2016, the entire contents of which are incorporated herein by reference in their entireties for all purposes.

SUMMARY

This invention relates to improvements in structural members for use in connecting together two components, for example a wishbone shaped linkage. It in particular relates to fibre reinforced structural members.

There are many instances where it is desirable to connect two components together using a structural member. A good example is the connection of a wheel carrier to the chassis of a vehicle where the wheel carrier has to be held in a defined position relative to the body and must resist impact loads during driving as well as carry the weight of the vehicle. A wishbone shaped structural member may be used providing connection at three points, two connected to one component and the remaining one to the other component. Alternatively, a dogbone shaped structural member may be used giving only two points of contact, one to each component. Other examples are the lattice of supporting struts which hold apart the outer surfaces of an aircraft wing.

In many cases, especially vehicles including cars, planes, trains and boats it is desirable for the structural member to be relatively light for a given rigidity, but also cost effective to manufacture. Reducing weight reduces the amount of energy needed to move the vehicle and in many cases a saving in weight can allow an increase in payload. For example a lorry which has a regulated maximum total laden weight including the weight of the vehicle itself can carry more load if the lorry is lighter.

Traditionally structural members such as wishbones have been made from metal, either in tubular form or as a casting. They are simple and relatively inexpensive to make but relatively heavy for a given rigidity. Steel is most widely used but in some cases aluminium has been used. Although aluminium is less dense there is often little weight saving over steel because it is also less rigid.

In areas where cost is less of a factor but ultimate low weight is required, for instance in the suspension of a racing car, structural members have been developed using sheets of woven carbon fibre material to form an outer skin around a mandrel. The mandrel may be removed prior to use to leave a hollow carbon fibre composite shell, or may be left in place in use. The later is easier to make but has a slight weight penalty even when the lightest of foam mandrels is used. However, such structural members are prohibitively expensive for most applications, both because of the material used throughout the structural but also because the lay-up of the materials is a slow and complex process.

An object of the present invention is to provide a structural member that ameliorates at least some of the problems associated with prior art structural members.

According to a first aspect the invention provides a structural member comprising:
a core portion that defines at least one anchor point, the core having at least one surface,
a fibre tow arranged in a closed loop on the surface of the core portion, the loop defining a boundary of a space which contains the at least one anchor point and
a protective shell formed from a woven fibre sheet material which covers the fibre tow,
and in which the core, fibre tow and the protective shell are impregnated and bound together by a cured resin.

In a preferred arrangement the invention provides a structural member for use in linking two components together in which the core portion defines at least two spaced apart anchor points, the core having two opposing surfaces, each surface being covered by a protective shell formed from a woven fibre sheet material,
each surface also being provided with a fibre tow arranged in a closed loop, the loop defining a boundary of a space which contains at least one anchor point and
each loop being sandwiched between the core portion and a respective one of the protective shells, and
in which the shells and the core are impregnated and bound together by a cured resin.

In this arrangement the core may comprise a central layer sandwiched on each side by a loop of two and a protective shell.

In an alternative, there may be two core portions which sandwich at least one loop of tow, the core portions being covered by respective protective shells. The protective shells therefore are separated from the loop by the cores, but still cover and thereby provide protection for both the loop and cores.

The loop or each loop may define a space which contains at least two anchor points.

The structural member may further include, between the or each surface of the core and the associated looped fibre tow, an inner shell of woven material. This material may comprise a dry weave of carbon fibre, or glass fibre, or other fibres, or a hybrid such as a carbon/glass weave. This shell separates the tow from the core.

By providing a bulk core portion and a loop of carbon fibre tow formed from multiple carbon fibre threads on each of its opposed outer surface bound together by a resin that impregnates all the layers it is possible to provide a structural member with excellent performance under tension and compression and also under bending moment, capable of holding two components in position relative to one another in a controlled manner. The bulk carrier ensures the two loops are offset from one another giving improved performance in bending as such a movement will create tension in a part of one of the loops which the fibres of that loop will resist. The continuous fibres of the loops perform very well under tension.

By tow we mean a bundle, typically unwoven, of continuous filaments, where each filament may be a man made fibre such as a carbon fibre or graphite fibre or a mix of different filaments within the tow. The filaments are preferably continuous and each may extend around the loop at least once, or more than once.

The core portion may make up the bulk of the thickness of the structural member at any given position along the structural member, each of the shells being relatively thin. The thickness of the core portion may be at least 10 times the thickness of the shell, or at least 50 times, for any given cross section through the structural member.

The core preferably comprises a low fibre volume (low fibre to composite ratio) material of carbon, glass or aramid fibres. It is preferred that the bulk carrier comprises a low cost material such as a felt. The material may be porous and may be impregnated with the cured resin that encapsulates the loops. By low volume we may mean a fibre volume fraction of less than 0.3, and perhaps less than 0.2. The bulk material of the core may comprise a felt of chopped fibres, for instance a recycled composite fibre material.

Low volume fraction keeps the cost of the core low, which is acceptable as the main strength of the component is provided by the shells and loops.

The core portion may be provided with a groove on each outer surface that corresponds to the path followed by the loop.

The inner shell may include a groove on the side facing away from the core portion that receives the loop, and provides a guide for the loop during assembly. The groove, in addition to forming a guide, will constrain the loop material so that it cannot straighten out under a tensile load.

The groove may pass right through the inner shell from an outermost to an innermost surface, forming a slot. In this case, the inner shell may be in two parts—one lying outside of the boundary of the space defined by the loop and the other inside the boundary of the space defined by the loop. These two parts may be connected or may be independent components during the manufacture of the structural member.

The groove may, in a modification, be formed in the surface of the core portion, with no inner shell being provided. In some arrangements no guide may be provided, with additional reinforcing material being wrapped around the loop to prevent it from straightening under a tensile load. This additional material may form part of the outer shell.

The inner shell may also be impregnated with the cured resin so that the loop is trapped within the resin that joins the inner shell and protective shells. The resin may therefore be continuous throughout the core, the inner shells and the tows as well as into the outer shells.

Each of the loops of tow may follow a path that defines a loop of minimum, or close to minimum length whilst encompassing the two or more anchor points.

To achieve the shortest length, each of the loops may comprise a linear part that extends between two anchor points, the linear part being connected to an adjacent linear part along the loop by a hook part that curves around the outside of an adjacent anchor point.

The linear parts of each loop may be oriented so that any force applied to the anchor points at each end of the linear part to pull them apart will act directly along the linear part of the loop.

The two loops may be identical in shape and size, and may be located relative to one another so that the spacing between any point on one loop and the corresponding point on the other loop is constant for all points along the loop.

The component may be shaped so that each of the two or more anchor points lies in a single plane, with the two loops also being planar. However, the anchor points may not all lie in a single plane.

Where the anchor points do all lie in a single plane the core portion may also be planar with the two loops being located on opposing sides of a central axis of the core portion.

Each of the loops of tow, e.g loops of continuous carbon fibre filaments, may comprise many turns from around the loop from a bundle of continuous filaments. The number of filaments in the two, the diameter of the tow and the filaments, and the number of layers of tow, may be tailored to the structural strength of the finished member that is required.

The two may comprise be multiple filaments that are unwoven or woven together into a rope, the rope then making multiple turns around the loop.

The two outer shells may cover the opposed surfaces and together may also cover the sides of the core portion to form a continuous protective outer shell.

Each of the loops may have a width across the outer surface of the core portion that is greater than the thickness of the loop, to form a flat strip or ribbon laid on the surface.

The loop may comprise one or more turns of a two comprising uni-directional carbon fibre filament spread tow ribbon. By ribbon we mean the filaments are arranged in a flat strip.

Multiple turns of tow may be provided which are arranged so that the loop forms a flat strip. This provides excellent resistance of the member to bending in a direction across the strip.

The strip may be a single loop of tow deep or multiple strands deep.

There may be a second, or third, loop of tow provided on the outer surfaces of the core portion, optionally spaced by an inner shell. These may be nested one inside the other. Where a second loop is provided this loop may define a space which does not contain the anchor portions, so that the anchor portions lie in a space defined between the second loop and the first loop.

The thickness of the outer shell and optional inner shell may vary at different locations on the structural component according to the rigidity of the component required at each location.

The structural member may include an infill piece located between an anchor point and the portion of the loop that passes around that anchor point. This infill piece may comprise a metal component, for example aluminium or aluminium alloy.

The infill piece may assist transferring load from the anchor effectively onto the hook portions of the fibre loop.

The infill piece may also function as a reliable and secure connection point for the anchor that connects to the anchor point. The anchor may, for instance, comprise a stud.

Various other infill pieces may be incorporated into the structural member to control the rigidity of the structural member. For instance, where additional flexure is needed then a non-porous infill piece of relatively flexible material may be placed between the core portion and outer shell which reduces the account of cured resin in that location, so that the component is more flexible.

The infill piece may be located below the outer shell, or may lie flush with the outer shell to form an outermost part of the structural member. The outer shell may therefore be cutaway to accommodate the infill piece.

The infill piece may be impregnated with resin, or may be non-porous and yet bonded to the rest of the structural member by the cured resin where it contacts the underside of the infill piece.

A hole may be provided that passes through both outer shells and the core portion at one or more of the anchor points for receiving a fastening such as a stud of bolt.

Each of the shells may comprise a high fibre fraction woven sheet material of carbon fibre, or glass fibre, or a hybrid of carbon and glass fibres. By high fibre we may mean a fraction of at least 0.4, or at least double the fraction of the core portion.

Each protective shell, and each optional inner shell, may comprise a single continuous sheet, or a layered arrangement of multiple sheets. Prior to assembly each sheet may be dry, meaning it comprises fibres and is free from resin, or may be a pre-preg which comprises woven fibres pre-impregnated with a curable resin.

The structural member may comprise a wishbone strut having three anchor points, the loop connecting and passing around the three anchor points.

In an alternative the structural member may comprise a dogbone shaped strut having two anchor points. The loop may be arranged in the shape of a dogbone, and the core portion or just the loop of tow.

Of course many other shapes and number of anchor points could be provided within the scope of the invention and the preceding are mentioned for illustrative purposes only.

The structural member may comprise a strut for a vehicle or a strut for a wing of an aircraft.

According to a second aspect the invention provides a method of constructing a structural member according to the first aspect comprising the steps of:

Providing the core portion,

Applying a tow of continuous filaments in a loop onto one surface,

Placing an outer shell over the loop,

Impregnating at least the outer shell with an uncured resin; and

Curing the impregnated resin.

The method may comprise providing the other outer surface with the associated loop and then providing the other outer shell over that loop.

Where an inner shell is provided, the method may comprise winding the loop onto the guide defined by the inner shell before covering with the outer shell.

The step of impregnating with resin may comprise impregnating both the core portion and shells with resin.

The step of curing the resin may be performed in a vacuum, for instance by placing the component into a bag and evacuating the air from the bag before adding the resin.

The method may comprise providing the inner shell, loop and outer shell as a sandwich and then placing the assembled sandwich onto the surface of the core portion.

The step of curing the resin may be performed using one or more of heat and pressure.

The method may comprise forming the inner shell and outer shell as a preform.

BRIEF DESCRIPTION OF THE SEVERAL VIEWS OF THE DRAWINGS

There will now be described, by way of example only, one embodiment of the present invention with reference to and as illustrated in the accompanying drawings of which.

DETAILED DESCRIPTION

The present invention relates to a structural member formed using a fibre-reinforced composite material. The fibre-reinforced composite material may be any fibre-reinforced material made of a polymer matrix reinforced with a fibre material. The fibre material may be, for example, carbon, glass, aramid or any other suitable reinforcing fibre known in the art. The polymer matrix may be any suitable material used to set the shape of the composite material, such as epoxy, vinylester or polyester thermosetting plastic. The fibre-reinforced composite structure may, for example, be a carbon-fibre or glass-fibre material suitable for use in the automotive, aerospace or construction industries.

Figure 1:
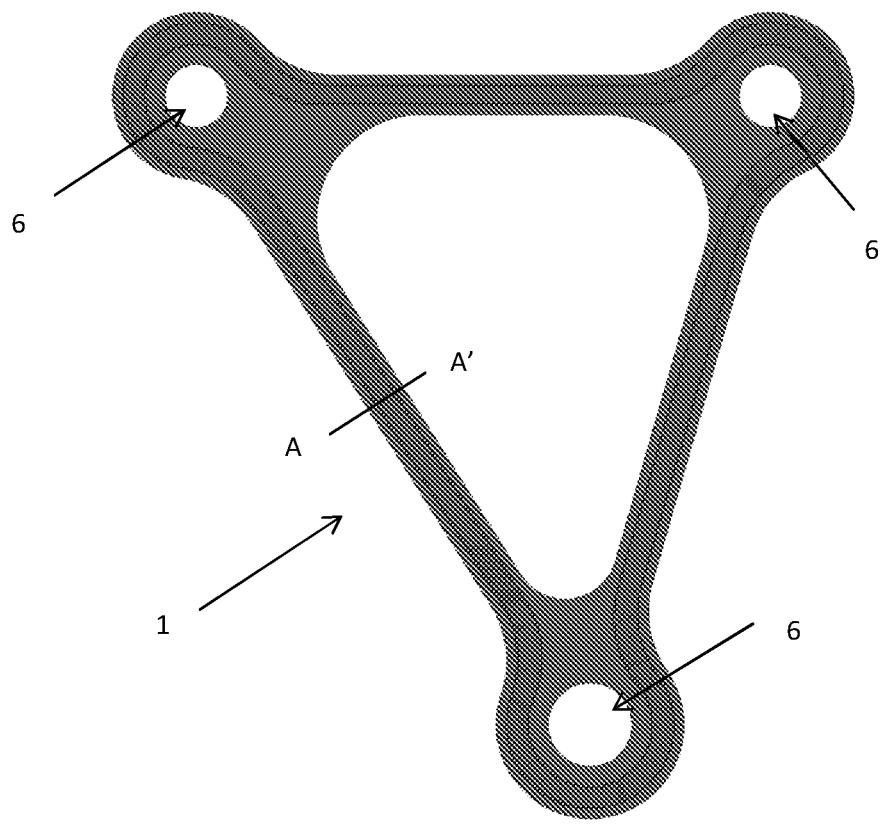
FIG. 1 is a view in perspective of an example of a complete structural member in accordance with an aspect of the invention.
Figure 2:
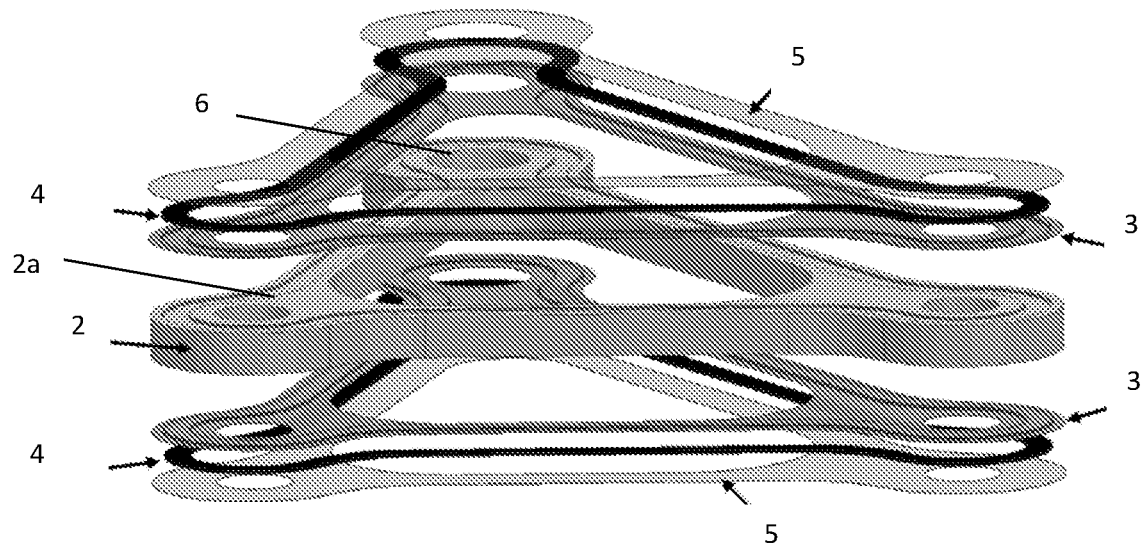
FIG. 2 is an exploded view of the major parts of the structure member of FIG. 1.
Figure 3:
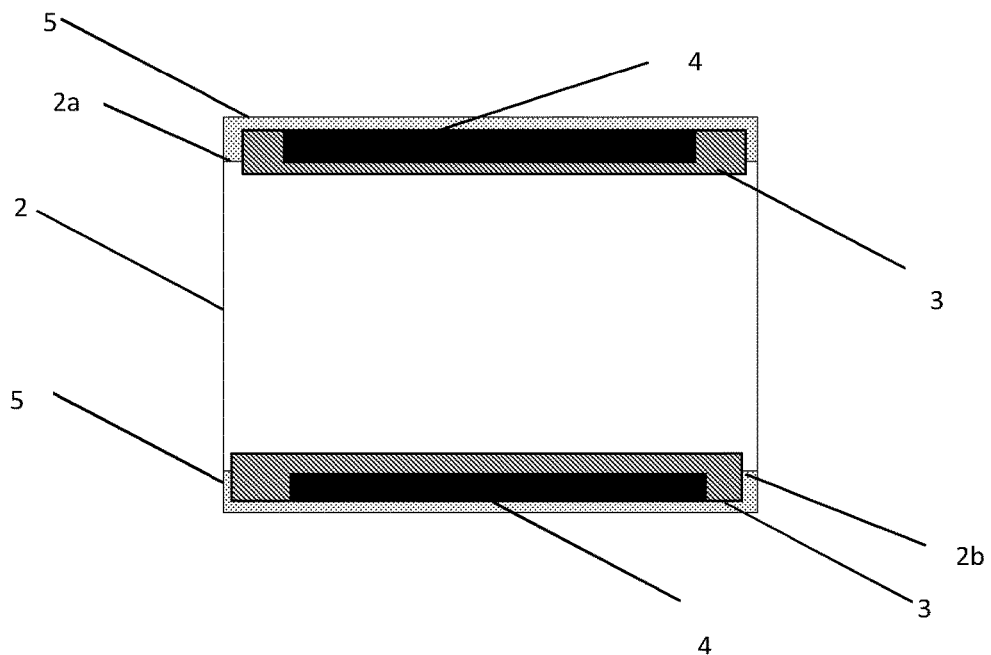
FIG. 3 is a cut away view of the structural member of FIG. 1.

An example of a structural member 1 that falls within the first aspect of the invention is shown in FIGS. 1 to 3 of the drawings. The member 1 comprises a wishbone which connects together two parts such as the body of a vehicle (not shown) and a wheel carrier (not shown). Three corners of the structural member each define an anchor point 6 which in this example is provided with a through hole that can receive a stud secured to the vehicle body or wheel carrier. In an alternative to a hole a stud could be welded or bonded to the face of the structural member 1 at each anchor point, or a mix of studs and holes could be provided. The skilled person will appreciate that the invention is not limited to three anchor points, and is not limited to the shape of the structural member shown in FIG. 1 when three anchor points are provided. Other shapes, for instance a V-shape with the anchor points at the two ends and corner of the V shape could be provided.

The structural member, as seen in FIG. 1, comprises three elongate straight portions that each extend between a unique pair of anchor points. A large opening is provided in the centre between these three straight portions to reduce the weight of the structural component, so that the three members in the example for a triangle. FIG. 2 shows, in exploded form, the key parts used in the assembly of the structural member 1, and FIG. 3 shows in a cutaway view how these parts connect together.

As best shown in FIGS. 2 and 3, the heart of the structural member 1 is a core portion 2 that defines the overall shape and thickness of the member. This accounts for the major part of the bulk of the member, and comprises in this example a low fibre volume material with a volume fraction of around 0.2. The core portion 2 has two major outer surfaces 2a and 2b that oppose one another, connected by an outer peripheral wall and an inner peripheral wall. In this example each of the two outer surfaces lie in a respective single plane, but the invention is not to be limited to such an arrangement.

Abutting each surface 2a, 2b is an inner shell 3 which has a perimeter that corresponds to the perimeter of the outer surface. The inner shell 3 has a loop shaped groove formed into its surface that faces away from the core portion 2 that receives a loop 4 of uni-directional fibre tow ribbon. The loop 4 passes around the outside of each anchor point. The groove of the inner shell 3 is transferred into a ridge on the underside of the inner shell that is located within a corresponding groove on the surface of the core portion 2. This helps ensure everything is aligned correctly during assembly.

Each inner shell 3 and loop 4 is then covered by a protective outer shell 5 formed from a woven fibre sheet material. As shown the outer shells 5 do not extend down the walls of the core portion, but it in envisaged within the scope of the invention that they may do that in order to completely enclose the core portion 2.

The core portion 2, inner shell 3 and outer shell 5, are impregnated with a resin which is cured to form the complete structural member.

It can be seen in FIG. 2 that the portions of the loop 4 between the anchor points 6 are straight, allowing the loop 4 to provide a high resistance to any forces that attempt to move the anchor points apart. Any compression is resisted by the resin and outer shells of woven fibre material.

A method of assembling the structural member which can be used is as follows.

In a first step the core portion 2 is formed by cutting from a bulk sheet of material, or laying up several layers of material to achieve the desired thickness. The inner shell 3 is then placed on one surface and a loop of fibre is laid into the groove on the inner shell. A robot could be used to perform this task. The outer shell 5 is then fitted, and the part formed member is turned over.

The step of adding the inner shell 3, loop 4 and outer shell 5 is then repeated on the second outer surface.

Once this is complete, the part formed member is placed in a vacuum bag and the air is removed. Resin is then injected into the member where it impregnates the shells and core portion.

Finally, heat and optionally pressure are applied to cure the resin according to the manufacturer's specification and the finished member is removed from the vacuum bag and allowed to cool. Any post machining may then be carried out, for instance to weld on anchors at the anchor points or to machine any holes that are needed in the member.

Figure 4:
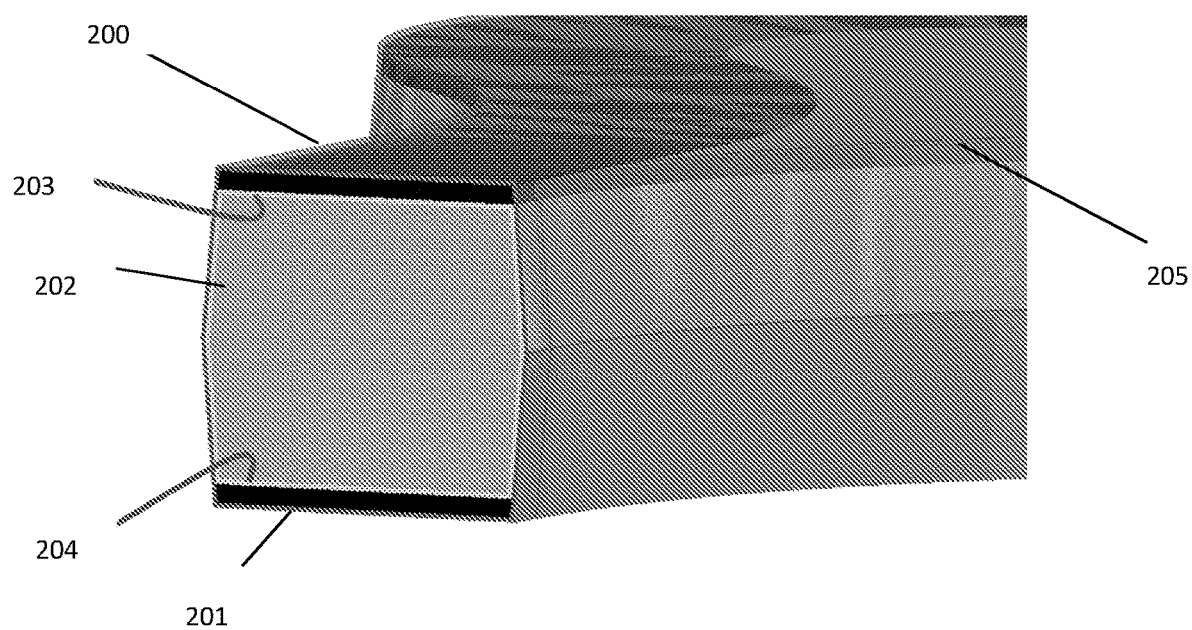
FIG. 4 is a cross section through an example of an alternative structural member that includes infill portions at each anchor point.
Figure 5:
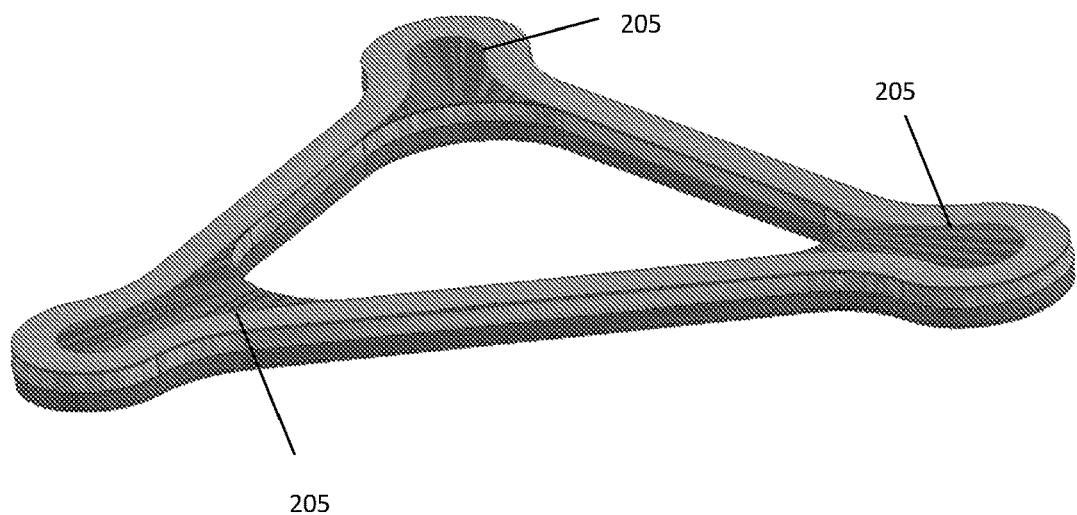
FIG. 5 shows the structural member of FIG. 4 in perspective.

A number of modifications are possible. FIGS. 4 and 5, for example, shows a similar member which has upper and lower shells 200, 201 that wrap around the sides of the member to fully enclose the core portion 202. These two shells 200, 201 meet each other midway down the sidewalls of the member. The inner shells 203, 204 also cover the sides of the core portion in this embodiment. The member also includes inserts or infill pieces 205, which in this example lie between each anchor point 6 and the loop 4 to control the transfer of load from the anchor point into the loop. As shown the infill pieces 205 lie on the surface of the core portion but they could be embedded in the core portion or replace sections of the core portion. These infills could be metal elements.

Infill pieces could be placed in a range of different positions, perhaps in between pairs of anchor points to provide increased or decreased flexure of the structure member between those anchor points.

Figure 6:
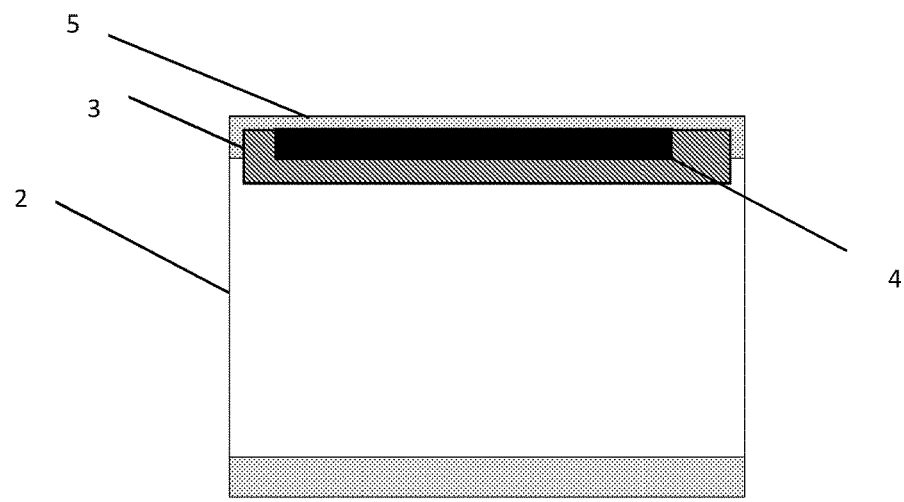
FIG. 6 is a cut away view of a still further embodiment of a structural member with a loop of two on one side of a core portion only and one anchor point.
Figure 7:
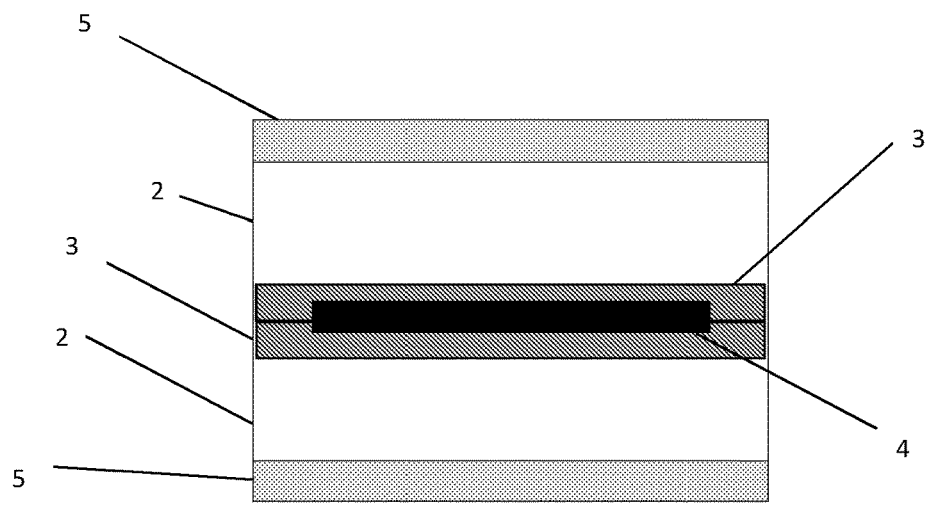
FIG. 7—is a cut away view of another embodiment where a single loop of tow is located between two core portions.

FIGS. 6 and 7 show two alternative arrangements. For clarity and expediency the same reference numerals used in FIG. 3 are used in these figures to indicate like components. As can be seen, the example of FIG. 6 has a loop on only one surface of a core portion. The example of FIG. 7 sandwiches the loop between two core portions, with a flexible sheets located on each side of the loop. In this case, the outer protective layers are spaced further from the loop but do still perform the same protective function for the loop and core.

The invention claimed is:

1. A structural member comprising:
   a core portion that defines at least one anchor point, the core having at least one surface,
   a fiber tow arranged in a closed loop on the at least one surface of the core portion, the loop defining a boundary of a space which contains the at least one anchor point,
   a protective shell formed from a woven fiber sheet material which covers the fiber tow, and
   between the at least one surface and the loop, an inner shell of woven material which includes a groove on a side facing away from the core portion that receives the loop and provides a guide for the loop during assembly,
   and in which the core, fiber tow and the protective shell are impregnated and bound together by a cured resin.

2. The structural member according to claim 1 for use in linking two components together
   in which the core portion has two opposing surfaces, each surface being covered by a protective shell formed from a woven fiber sheet material,
   each surface also being provided with a tow of continuous filaments arranged in a closed loop, the loop defining a boundary of a space which contains the at least one anchor point and
   each loop being sandwiched between the core portion and a respective one of the protective shells, and
   in which the shells and the core are impregnated and bound together by a cured resin.

3. The structural member according to claim 1 in which the core portion has a thickness defined as the shortest distance between the two opposing surfaces at any position along an outer surface that is at least 10 times the thickness of the shell of the outer surface at that position.

4. The structural member according to claim 1 in which the core comprises a material of carbon, glass or aramid fibers.

5. The structural member according to claim 1 in which the core portion is provided with a groove on each outer surface that corresponds to the path followed by the loop.

6. The structural member according to claim 1 in which the loop or each of the loops follows a path that defines a loop of minimum length, or close to minimum length, defining a space that encloses the two or more anchor points.

7. The structural member according to claim 1 in which each of the loops comprises a linear part that extends between two anchor points, the linear part being connected to an adjacent linear part along the loop by a hook part that curves around the outside of an adjacent anchor point, the linear parts of each loop being oriented so that any force applied to the anchor points at each end of the linear part to pull them apart will act directly along the linear part of the loop part.

8. The structural member according to claim 1 in which the two loops are identical in shape and size, and are located relative to one another so that the spacing between any point on one loop and the corresponding point on the other loop is constant for all points along the loop.

9. The structural member according to claim 1 in which each of the loops comprises multiple turns of tow around the loop.

10. The structural member according to claim 1 in which the two outer shells cover the opposed surfaces and together also cover the sides of the core portion to form a continuous protective outer shell around the core portion.

11. The structural member according to claim 1 in which the structural member includes an infill piece located between an anchor point and the portion of the loop that passes around that anchor point.

12. The structural member according to claim 1 in which a hole is provided that passes through both outer shells and the core portion at one of the anchor points for receiving a fastening such as a stud or bolt.

13. The structural member according to claim 1 in which each of the shells comprises a woven sheet material.

14. The structural member according to claim 1 which is configured as a wishbone strut having three anchor points, the loop connecting and passing around the three anchor points.

15. The structural member according to claim 1 which is configured as a dogbone structure having two anchor points.

16. The structural member according to claim 14 in which the structural member comprises a strut for a vehicle or a strut for a wing of an aircraft or comprises an integral part of a vehicle body or chassis.

17. A structural member comprising:
- a core portion that defines at least one anchor point, the core having at least one surface,
- a fiber tow arranged in a closed loop on the at least one surface of the core portion, the loop defining a boundary of a space which contains the at least one anchor point, and
- a protective shell formed from a woven fiber sheet material which covers the fiber tow,
- in which the core, fiber tow and the protective shell are impregnated and bound together by a cured resin, and
- in which the core portion is provided with a groove on each outer surface that corresponds to a path followed by the loop.

* * * * *